J. F. O'CONNOR.
COMBINED FRICTION SHELL AND SPRING CASING.
APPLICATION FILED JULY 1, 1918.
1,293,891. Patented Feb. 11, 1919.
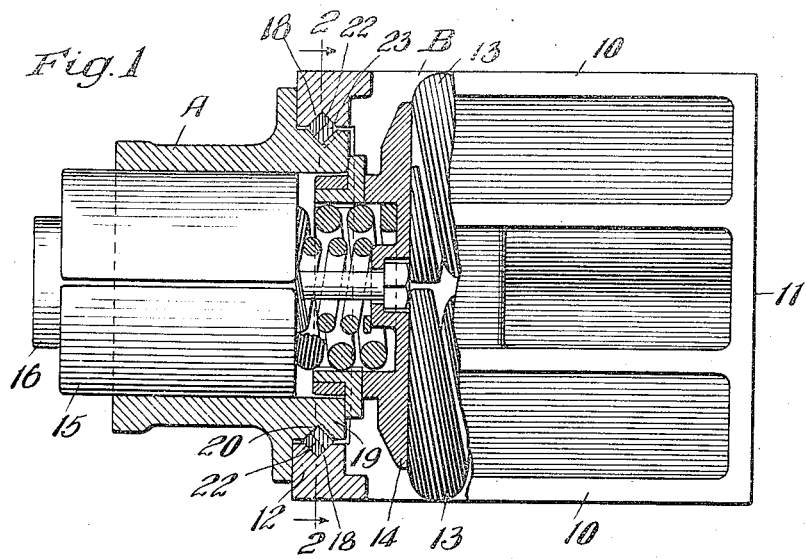
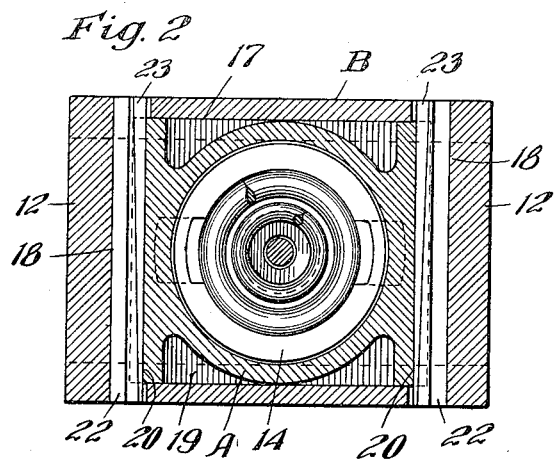
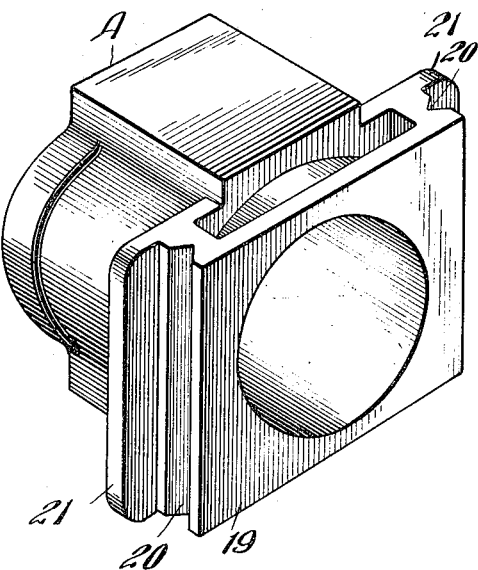
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

COMBINED FRICTION-SHELL AND SPRING-CASING.

1,293,891.　　　　　Specification of Letters Patent.　　Patented Feb. 11, 1919.

Application filed July 1, 1918. Serial No. 242,826.

*To all whom it may concern:*

Be it known that I, JOHN F. O'CONNOR, a citizen of the United States, residing at Chicago, in the county of Cook and State of Illinois, have invented a certain new and useful Improvement in Combined Friction-Shells and Spring-Casings, of which the following is a full, clear, concise, and exact description, reference being had to the accompanying drawings, forming a part of this specification.

This invention relates to improvements in combined friction shells and spring casings.

Heretofore, it has been the general practice to manufacture friction shells and spring casings for railway draft riggings as integral structures. Consequently, when any part breaks or becomes excessively worn, the entire structure must be replaced with another combined shell and casing. As is well known, in the operation of friction gears for railway draft riggings, the friction shell is the part subjected to the greatest wear and consequently, is the part which wears out the most rapidly. Under the old general practice, where the shell and casing are formed integrally, the wearing out of the shell necessitates replacement not only of the shell but of the casing, even though the latter may be perfectly serviceable and hence involves an unnecessary cost and waste of material.

The object of my invention is to provide a friction shell and spring casing so that these parts are capable of separate manufacture and replacement and in addition, to provide means for rigidly securing the shell and casing together so that they will withstand the severe shocks encountered in service.

More specifically, the object of my invention is to provide a friction shell and spring cage having a detachable connection wherein the connection is especially adapted to compensate for any irregularities or variations that may occur in the manufacture of the parts under ordinary commercial practice.

In the drawing forming a part of this specification, Figure 1 is a part elevational view, part longitudinal, sectional view of a friction shock absorbing mechanism embodying a detachably connected shell and casing and illustrating my improvements in connection therewith. Fig. 2 is a transverse, sectional view taken on the lines 2—2 of Fig. 1. And Fig. 3 is a detail, perspective view of the friction shell proper.

In said drawing, A designates the friction shell proper and B the spring casing or cage, the same being detachably connected as hereinafter described.

The casing B is of substantially rectangular formation having spaced side walls 10—10, rear wall 11 and front wall 12. The casing is so designed that it is adapted to receive a pair of springs 13 and a follower 14, as clearly shown in Fig. 1.

The friction shell A is of substantially cylindrical form and coöperable therewith is shown a well known arrangement of friction elements comprising friction shoes 15 and wedge 16.

To form the detachable connection between the shell and casing B, the latter is provided at its forward end with a substantially rectangular opening 17 in the front wall 12 thereof. The opposed edges of the front wall 12 formed by the opening are provided with vertically extending rightangled V-shaped grooves 18—18. The shell A at its rear end is provided with a substantially rectangular extension 19 adapted to fit within the corresponding opening 17 and the side edges of said extension 19 are similarly provided with rightangled V-shaped grooves 20—20 arranged to be longitudinally alined with the grooves or recesses 18. In addition, the shell A is provided with a pair of laterally extended flanges 21—21 which seat against the forward side of the transverse front wall 12 of the casing B. To securely hold the shell and casing rigidly together, I employ two tapered keys 22 and 23 in each of the sets of grooves 18 and 20. In each pair of keys 22 and 23 one is inserted from one side and the other from the opposite side so that they are wedged home from opposite sides of the castings.

As clearly appears from Fig. 1, the result of bringing the sets of rightangled V-shaped grooves 18 and 20 opposite each other is to provide an opening which is of substantially square or rectangular cross section so that the two tapered keys will fill the same and effectively unite the parts. By employing this construction, any inequalities such as might occur in commercial manufacture in the grooves 18 and 20, do not injuriously affect the key connection since any variations between opposed surfaces of the said slots when alined are compensated for by the taper of the two keys. Furthermore, it will be noted that all of the keys 22 and 23 are under shear for their entire length and thus the connection is many times stronger than if a key connection were employed where the connection is under transverse shear at one or more points in its length. This is of considerable importance because of the fact that there is a tendency during release action of the friction mechanism to force the shell A outwardly from the casing B. Of course, in the compressive stroke, inward movement of the shell relatively to the casing would be resisted by the flanges 21 in addition to the keys themselves.

I claim:

1. In a device of the character described, the combination with a casing, of a separate friction shell, said casing and shell having coöperable slots adapted to be longitudinally alined when the casing and shell are assembled, and keys disposed within said slots, said keys being placed under shear throughout their length upon tendency of the shell and casing to shift longitudinally relatively to each other.

2. In a device of the character described, the combination with a casing having an opening at one end thereof, of a shell having one end thereof extended and fitting within said opening, the overlapping parts of said shell and casing having opposed slots and keys extending lengthwise of said slots, each key being positioned partly within a slot of the casing and partly within an opposed slot of the shell.

3. In a device of the character described, the combination with a shell, of a casing, said casing having an opening at one end thereof and the shell being extended partly within said opening, the overlapping parts of said shell and casing within the opening being provided with opposed V-shaped slots, and a key in each set of said slots for wedging the parts into rigid engagement with each other.

4. In a device of the character described, the combination with a spring casing having a substantially rectangular opening in one end wall thereof, two opposed edges of said wall surrounding the opening being provided with V-shaped slots extending lengthwise of the edges, a friction shell having a substantially rectangular end adapted to fit within said rectangular opening, two opposite edges of said rectangular extension being provided with V-shaped grooves adapted to aline with those in the casing, and a pair of tapered keys extending within each set of opposed V-shaped grooves in the casing and shell.

In witness that I claim the foregoing I have hereunto subscribed my name this 15th day of June, 1918.

JOHN F. O'CONNOR.